United States Patent [19]
Gebhardt

[11] Patent Number: 5,447,224
[45] Date of Patent: Sep. 5, 1995

[54] KIT FOR STANDARDIZING AND FORMING A MODULAR CONSTRUCTION SYSTEM FOR CHAIN-CONVEYORS, ACCUMULATING CHAIN CONVEYORS AND/OR TOOTHED BELT CONVEYORS

[75] Inventor: Gunter Gebhardt, Waibstadt, Germany

[73] Assignee: Gebhardt Fordertechnik GmbH, Sinsheim, Germany

[21] Appl. No.: 185,143

[22] Filed: Jan. 24, 1994

[30] Foreign Application Priority Data

Jan. 22, 1993 [DE] Germany .......... 93 00 855.4

[51] Int. Cl.[6] ............................................. B65G 21/00
[52] U.S. Cl. ............................... 198/861.1; 198/832
[58] Field of Search ............. 198/860.1, 861.1, 832, 198/813

[56] References Cited
FOREIGN PATENT DOCUMENTS

| 0001618 | 1/1988 | Japan | 198/861.1 |
|---|---|---|---|
| 404266308 | 9/1992 | Japan | 198/860.1 |

Primary Examiner—James R. Bidwell
Attorney, Agent, or Firm—Staas & Halsey

[57] ABSTRACT

A kit for standardizing and forming a modular construction system for chain conveyors, accumulating chain conveyors and/or toothed belt conveyors. With the kit, which is a constructional unit, many different specifically designed systems can be mass produced since a conveyor is disassembled into subassemblies, subgroups and component parts, in which case it may be possible to combine subassemblies with one another so that the standardized program can meet many different customer-specific requirements.

15 Claims, 7 Drawing Sheets

KIT FOR STANDARDIZING AND FORMING A MODULAR CONSTRUCTION SYSTEM FOR CHAIN-CONVEYORS, ACCUMULATING CHAIN CONVEYORS AND/OR TOOTHED BELT CONVEYORS

BACKGROUND OF THE INVENTION

The invention relates to a constructional unit for standardizing and forming a modular construction system for chain conveyors, accumulating chain conveyors and/or toothed belt conveyors.

1. Field of the Invention

Conveyors of the initially mentioned type are used for the transport of many different goods within warehouses, production centers or shipping facilities. According to their application and customer-specific range of usage, these conveyor systems have many different shapes with respect to the length, sectioning and conveying range of the system. Each system therefore requires a new concept and construction and therefore new planning and assembling.

2. Description of the Related Art

The result is that the above-mentioned preliminary services are reflected in the final price.

SUMMARY OF THE INVENTION

The present invention is therefore based on the object of providing a constructional unit for standardizing and forming a modular construction system for chain conveyors, accumulating chain conveyors and/or toothed-belt conveyors whose constructional unit elements, thus the product parts, can be used for many different specifically designed facilities and can therefore be mass produced. The object is therefore the manufacturing of a conveyor of the initially mentioned types which can be disassembled into subassemblies, subgroups and component parts, and in which case it may be possible to combine subassemblies with one another so that the standardized program can meet many different customer-specific requirements.

An important component of the present invention is a frame profile which, as a result of prefabricated bearing bores and a corresponding shaping, is suitable for permitting a preassembly, so that the product parts required for the customer-specific implementation of the conveyor system must only still be assigned. In this case, if necessary, an adapter element is connected between the specific inserts and the prefabricated standard parts.

Since a preassembly will only be possible if the preassembled parts can be assigned universally to the customer-specific system, the conveyor systems of the initially mentioned types also require the system-specific arrangement or distribution of the conveyor sections which are directly dependent, for example, on accumulating zones. This also requires a corresponding guiding of the conveying devices which, in the case of chains or belts, must have a defined tension which is adapted to the operation. If now a prestandardized conveying device is also used, the assignment of a corresponding tensioning device is also required which is also universally usable, that is, adaptable to the preassembled constructional unit elements.

According to the present invention, it is now provided that two frame frame profile are used which is to be arranged on respective sides of the conveying path. Corresponding drive shafts are premounted in the two frame profiles in prefabricated bearing bores at almost any profile point. A fastening device is guided through the bores in the frame profiles, which fastening device, by way of a guide bush, receives a guide bearing which, in turn, is set in the drive shaft. By way of a bearing, the drive shaft itself is arranged in a bearing cap. This bearing cap, in turn, is guided from the interior side of the corresponding frame profile to the same frame profile and is fastened there. At a suitable point, which is specific with respect to conveyor systems, corresponding deflection wheels are mounted. Then the conveying device will be applied, which may be a belt or a chain, so that it extends approximately on the upper edge of the frame profile and corresponds with the drive shaft by way of the deflection wheels. For the purpose of a clean chain travel, a tensioning box is connected according to the present invention between the deflection rollers and the drive shaft and permits the use of a standardized chain or belt because, as a result of the adjustment play of the tensioning box, the guide length of the belt or the chain can be shortened or lengthened.

The tensioning box can also be arranged at any profile point by means of a plurality of prefabricated bearing bores. Furthermore, this tensioning box has oblong-hole-shaped bearing and fixing recesses in order to ensure a subsequent tensioning of the conveying device.

For the guiding of the conveying device, the tensioning box has a deflection head which is designed for this conveying device. The frame profile has skids or grooves in which the motor console or the bearing cap can be slidably arranged and fixed.

The above-mentioned constructional unit elements can be inserted into the grooves and can be slid to their mounting position. The chain wheels or pulleys to be assigned to the constructional unit are inserted into the frame profile constructed as a hollow section and are also fixed at any profile point. While the chain wheels or pulleys, being sunk in the frame profile, are disposed above the drive shaft, the deflection wheels project beyond the upper edge of the frame profile. The frame profile, which is constructed to be open on its surface, will then be covered by means of a slide strip so that the conveying device, such as the chain, will be guided. The drive shaft itself is provided with a guide bearing and obtains its actual bearing inside the bearing cap which is fastened to the interior edge of the frame profile. The motor console can be slid into the lower grooves or slide rails of the frame profile and can be fixed. The above-described constructional unit elements are standardized according to the invention so that only an intermediate shaft may be assigned to them which has an adapter function and which forms the actual link between the constructional unit and the other system parts, the intermediate shaft finally determining the width of the conveyor system.

The invention will now be explained in detail by means of the attached drawings which specifically show preferred embodiments of the invention.

DESCRIPTION OF THE PREFERRED EMBODIMENT

Figure 1:
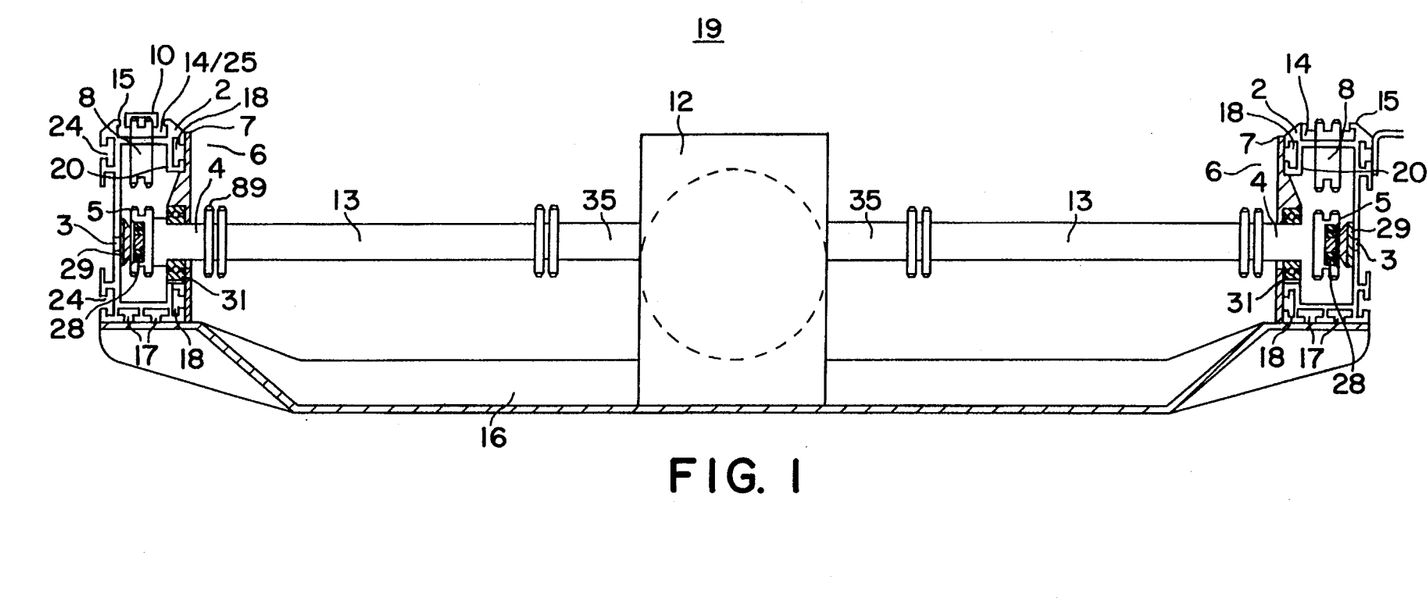
FIG. 1 is a cross-sectional view of a conveyor system according to an embodiment of the present invention.

FIG. 1 is a cross-sectional view of a conveyor system. This embodiment shows a chain conveyor or an accumulating chain conveyor. A motor 12 is mounted on a console 16. The motor carries a driven output shaft 35 on both sides. The motor console 16 is inserted and fixed in frame profiles 2 arranged on the left and on the right. The frame profiles 2 are constructed as hollow sections so that they receive in their interior at least partially the drive shafts 4 as well as the chain wheels 5 and the deflection wheels 8. On their faces, the drive shafts 4 carry the corresponding chain wheels 5 and 89 and are fixed on the exterior profile wall by a guide bearing 28 together with the a bush 29 on the frame profile 2, while the bearing takes place by way of a shaft 13 bearing 31 arranged in a bearing cap 7.

In this case, the bearing cap 7 is fastened to the interior side of the profile. The adaptation between the motor 12 and the driven shaft 35 and the drive shaft 4 takes place by way of a corresponding intermediate shaft 13. The connection between the motor and the intermediate shaft as well as between the intermediate shaft 13 and the drive shaft 4 takes place by means of a duplex chain which is not shown here.

The deflection wheels 8 are positioned such in the frame profile 2 that they project beyond the upper edge 15 of the profile, while the chain wheels 5 are sunk in the frame profile 2.

Figure 2:
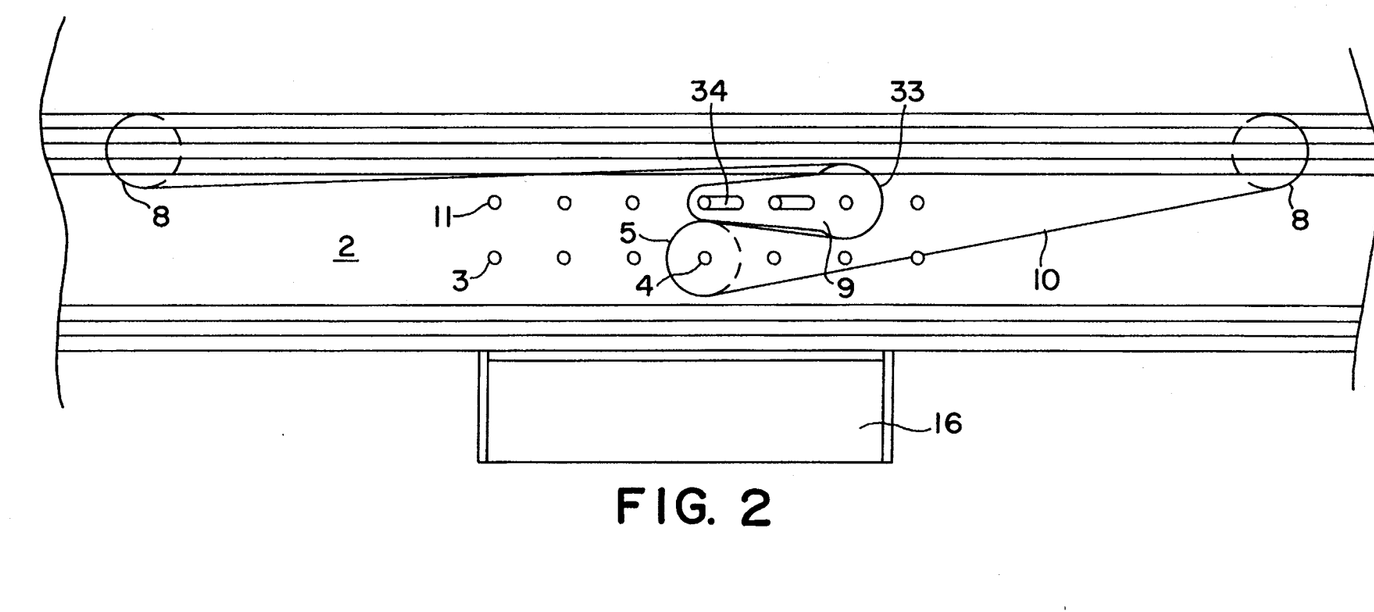
FIG. 2 is a longitudinal sectional view of the conveyor system shown in FIG. 1.

FIG. 2 is a longitudinal sectional view of the above-mentioned conveyor system. The frame profile 2 provides a plurality of prefabricated bearing bores 3 for the positioning of the drive shaft 4 as well as a plurality of bearing bores 11 for the tensioning box 9. As a result, the position of the drive shaft 4 and its chain wheels 5 as well as that of the tensioning box 9 can be selected almost arbitrarily. Likewise, the position of the deflection wheels 8 on the frame profile 2 is freely selectable. The conveying device, in this case, a chain, is marked as reference number 10. It projects in the longitudinal direction of the frame profile 2 into the transport path and is guided by way of the deflection wheels 8 to the drive shaft 4 and to the chain wheel 5.

In this case, the chain 10 is placed over the tensioning roller 9 and its deflection head 33. By means of the oblong-hole-shaped bearing and fixing recesses 34, the conveying device or the chain 10 is tensioned because the tensioning box 9 can therefore be moved in the longitudinal direction of the frame profile 2.

Figure 3:
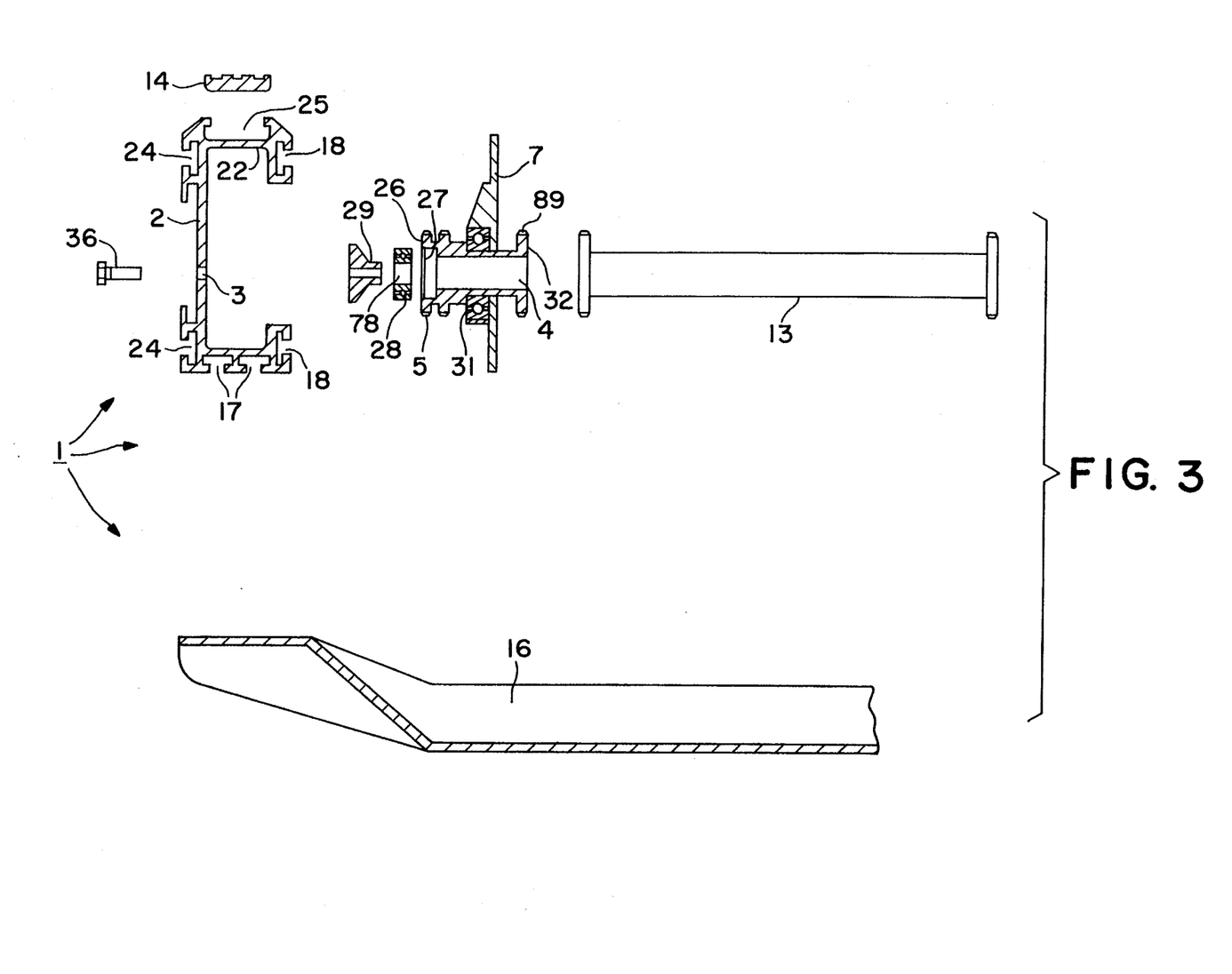
FIG. 3 is an exploded representation of a constructional unit of the conveyor system shown in FIG. 1.

FIG. 3 is an exploded representation of parts of the constructional unit 1 according to the present invention. It first shows the frame profile 2 which is constructed as a hollow section. The guide bush 29 is received by way of the fastening screw 36 which is guided through the bearing bore 3. The guide bearing 28 is applied to the guide bush 29 which, in turn, are jointly inserted into the recess 27 of the drive shaft 4. The drive shaft 4, in turn, carries a shaft bearing 31. The shaft bearing 31, which surrounds the drive shaft 4 is inserted into the bearing cap 7 so that the chain wheels 5 arranged on the face 26 of the drive shaft 4 come to be situated within the frame profile 2 and the chain wheel 89 of the face 32 of the drive shaft 4 is positioned outside the frame profile in front of the bearing cap 7. The shaft connection with the intermediate shaft 13 takes place by way of a duplex chain, in which case the intermediate shaft 13, in turn, is connected with the motor shaft not shown here also by means of a duplex chain.

For supporting the chains, a slide strip 14 is inserted into the T-groove-shaped skid 25 of the frame profile 2 which forms the top surface 22 of the frame profile 2. The motor console 16 is inserted and fixed in the skids 17 which also have a T-groove-shaped construction.

Figure 4:
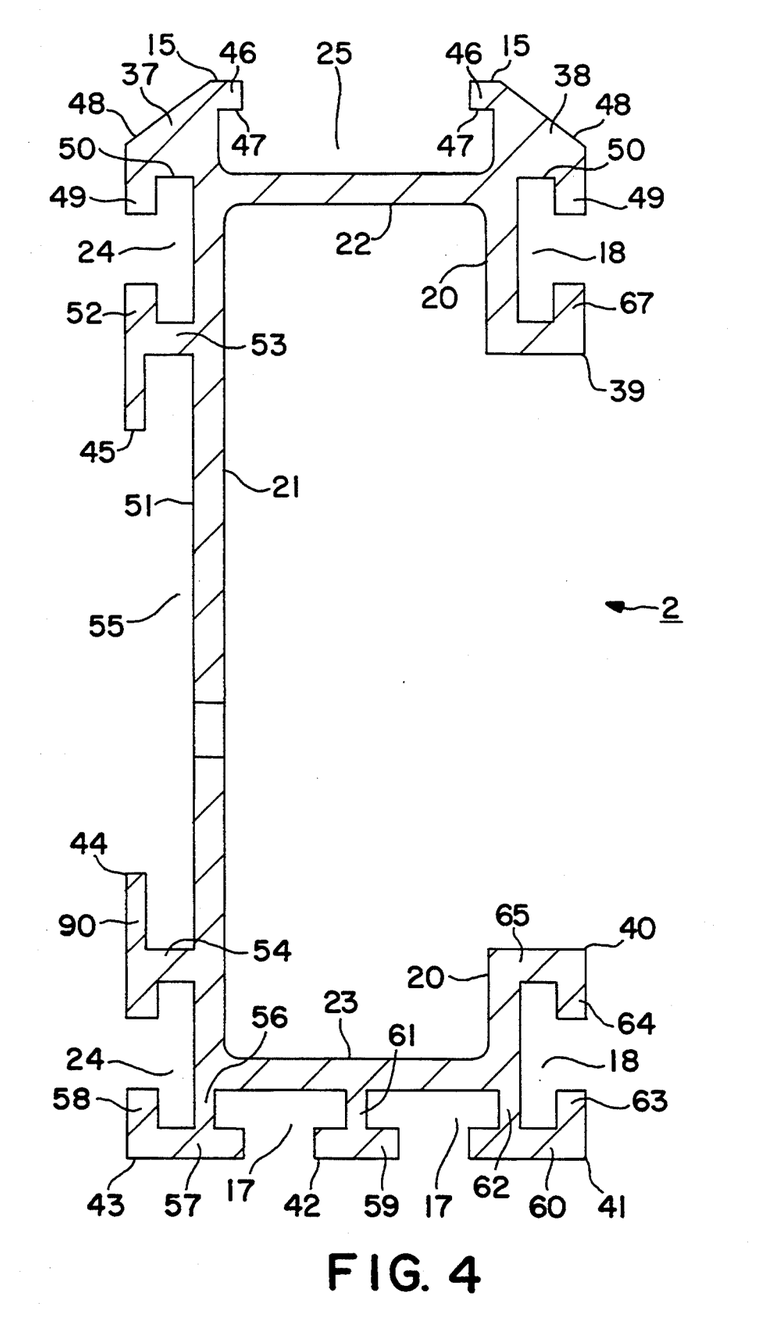
FIG. 4 is a view of a frame profile of the conveyor system shown in FIG. 1.

FIG. 4 illustrates the frame profile 2 according to the present invention which is part of the constructional unit 1. The frame profile 2 has a rectangular basic body which comprises the walls 20, 21, the top surface 22 and the bottom surface 23. Raised cams or hooks 37 to 45 are disposed on the frame profile 2 and are distributed on the circumference. The cams 37 and 38 arranged in the area of the top surface 22, in turn, have projecting noses 46 which form the upper edge 15 of the profile. Since the noses 46 project from the cams 37, 38 toward the profile center, a step 47 is formed so that the skid 25 receives a T-groove-shaped design in the area of the top surface 22. Starting from the upper edge 15 of the profile, the noses 46 are changed into a bevel 48 which changes into a hook surface 49 which points vertically downward. These hook surfaces 49 project beyond the cam body and its interior edge 50 vertically downward and are spaced away from the rectangular exterior edge 51 of the basic body. The T-groove-shaped skid 24 on the exterior side 51 of the profile is formed in an interaction between the cams 37 and 45, whose flange 52 is spaced away from the exterior edge 51 of the profile by means of a web 53, and is aimed in the direction of the hook surface 49 of the cam 37. Furthermore, the above-mentioned flange 52 of the hook 45 projects vertically downward and, in this case, is directed against the cam or hook 44 which is also removed from the outer edge 51 of the profile by way of a web 54 and is spaced away from it. This cam/hook 44 also has a flange 90 which projects on both sides of the web 54 so that a T-groove-shaped skid 55 is formed between cam 45 and cam 44.

The cam 44 corresponds with another cam 43 which are both arranged on the exterior edge 51 of the profile, or the cam 43 is arranged on the edge between the exterior edge 51 of the profile and the bottom surface 23. The cam 43 projects away from the main body of the profile by means of a web 56 which points vertically downward, and changes into a flange 57. On its side toward the exterior edge of the profile, the flange 57 has a bend 58 which projects vertically upward and is directed to the flange 90 of the cam 44. The bend 58 of the cam 43 as well as the flange 90 of the cam 44, in this case, are raised from their webs and flanges 54 and 57 in such a manner that another T-groove-shaped skid 24 is formed. In the area of the bottom surface 23 of the frame profile 2, two skids 17 are arranged which have a T-groove-shaped construction. These skids 17 are formed by the flange 57, a flange 59 and a flange 60. As illustrated above, the flange 57 of the cam 43 is spaced away from the bottom surface 23 by means of the web 56 and projects toward the interior side of the profile beyond the web 56.

The flange 59 of the cam 42 is spaced away from the bottom surface 23 of the frame profile 2 by means of a web 61. In this case, the web 61 projects vertically downward away from the bottom surface 23 and carries the above-mentioned flange 59 in a rectangularly aligned manner, which flange 59 projects on both sides beyond the wall of the web 61 so that, by means of the geometric construction of the cam 43 and of the cam 42, the skid 17 is formed first and the adjacent skid 17 is formed corresponding to the cam construction 41. For this purpose, the cam 41 or its flange 60 projects by means of a web 62 away from the bottom surface 23 of the frame profile 2, in which case the web 62 is directed vertically downward and the flange 60 is arranged approximately at a right angle with respect to it.

This flange 60 projects beyond the web thickness in the direction of the cam 42. Thus, in this case also, a T-groove-shaped skid 17 is formed. Directed toward the interior side of the profile, the flange 60 projects beyond the wall 20 and has a bend 63 pointing vertically upward. Pointing vertically upward, this bend 63 is directed toward the bend 64 of the cam 40 which, in turn, is spaced away from the wall 20 by way of the web 65. As described above, in the interaction between cam 40 and 41 and its shaping, the T-groove-shaped skid 18 is formed on the interior wall 20 of the profile. A skid 18 of the same design is situated in the area of the interior wall 20 of the profile in the transition area to the top surface 22. On the edge between the profile wall 20 and the top surface 22, a cam 38 is positioned which carries in the area of the top surface 22 a nose 46 which is slightly spaced away from the top surface 22, which nose 46 projects beyond the cam body 38 and is directed toward the nose 46 of the cam 37. As mentioned above, the T-groove-shaped skid 25 is formed here. Spaced away from the profile wall 20, the cam 38 has a nose 49 which is directed vertically downward. This nose 49 corresponds with a nose 67 of the cam 39 which is directed vertically upward toward the nose 49. Thus a skid 18 is formed which is equivalent to the skid in the bottom area or transition area to the interior edge of the profile.

Figure 5:
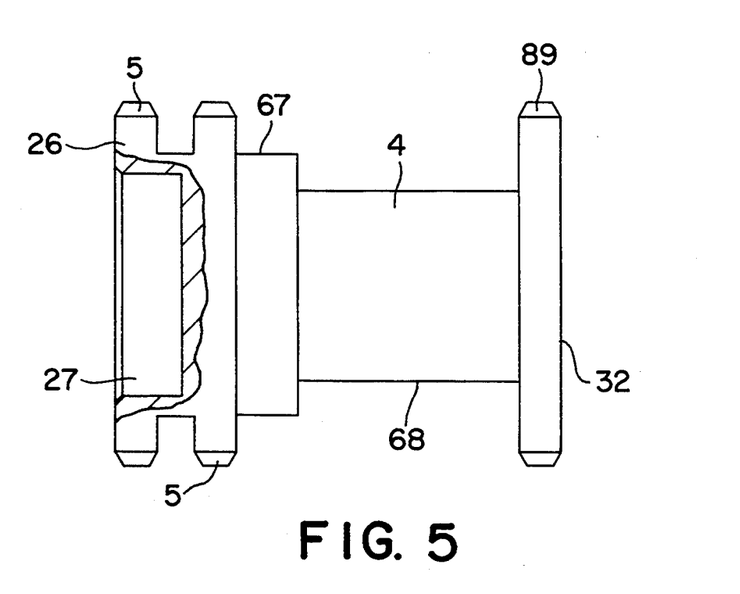
FIG. 5 is a view of a drive shaft of the conveyor system shown in FIG. 1.

FIG. 5 shows a drive shaft 4. The drive shaft 4 may be formed by a shaft body which carries chain wheels 5 and 89 which are placed on it, or it may be constructed in one piece with it. In this embodiment, three chain wheels 5/89 are arranged on the drive shaft 4. Two chain wheels are situated on the face 26 pointing toward the exterior edge of the profile and one chain wheel 89 is situated on the face 32 pointing to the motor. In this case, the chain wheels 5 arranged on the left side form a chain wheel pair, while the chain wheel 89 arranged on the right side in the area of the face 32 pointing toward the motor also forms a chain wheel pair with the chain wheel of the intermediate shaft. Between the chain wheel 89 of the face pointing toward the motor and the inner chain wheel 5 of the face 26 pointing toward the exterior wall of the profile, a turned-down portion 68 is formed starting from the first step 67, on which the turned-down portion 68 the shaft bearing 31 is mounted. On the face 26 pointing to the exterior edge of the profile an interior recess 27 is provided for the guide bearing 28.

Figure 6:
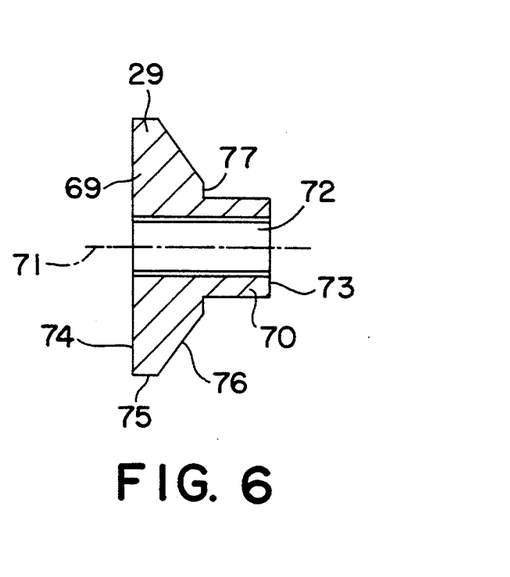
FIG. 6 is a view of a guide bush of the conveyor system shown in FIG. 1.

FIG. 6 illustrates the guide bush 29. This guide bush 29 has a truncated-cone-shaped head 69 and a cylindrical guide body 70. A threaded bore 72 is situated centrically about the center axis 71, which bore 72 penetrates the guide sleeve 29 from its face 79 to its head side 74. The conical course 76 extends from the exterior circumferential wall 75 to a step 77 which strikes against the guide bearing 28. The cylindrical guide body 70 projects into the interior bore 78 (see FIG. 3) of the guide bearing 28.

Figure 7:
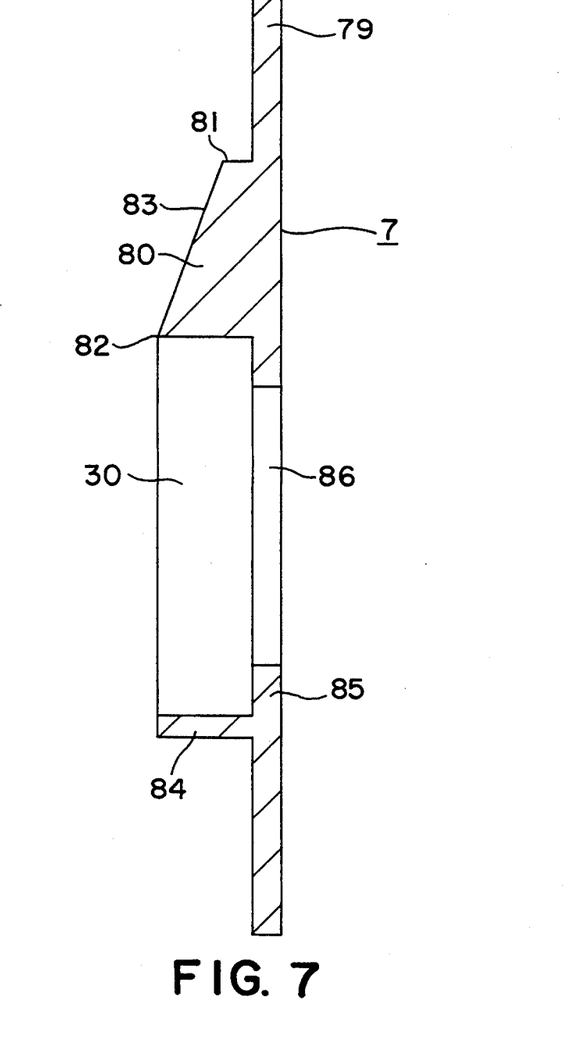
FIG. 7 is a view of a bearing cap of the conveyor system shown in FIG. 1.

FIG. 7 shows the bearing cap 7. Starting from a cap surface 79, a thickening 80 rises toward the interior side of the profile, which thickening 80 turns to a step by way of an edge 81 which is aligned vertically with respect to the cap surface 79. A bevelled surface 83 exists between this edge 81 and the highest edge 82 of the thickening 80. In the lower area of the bearing cap 7, a web 84 rises in a cross-sectional view, which web 84 is a part of the thickening 80 and therefore forms the circumferential wall for the shaft bearing 31.

For this purpose, a recess 30 for the shaft bearing 31 is provided in the bearing cap and in the thickening 80. The centrically arranged web 85, which bounds the shaft bore 86, is used as the bearing stop.

Figure 8:
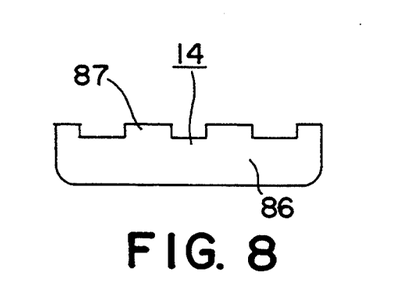
FIG. 8 is a view of a slide strip of the conveyor system shown in FIG. 1.

FIG. 8 illustrates the slide strip 14 which is placed on the upper edge 15 of the frame profile or inserted into the T-groove-shaped skid 25. Comb-type teeth 87 rise from the basic body 86 of the slide strip 14 in which the chains 10 are supported during their travel.

Figure 9:
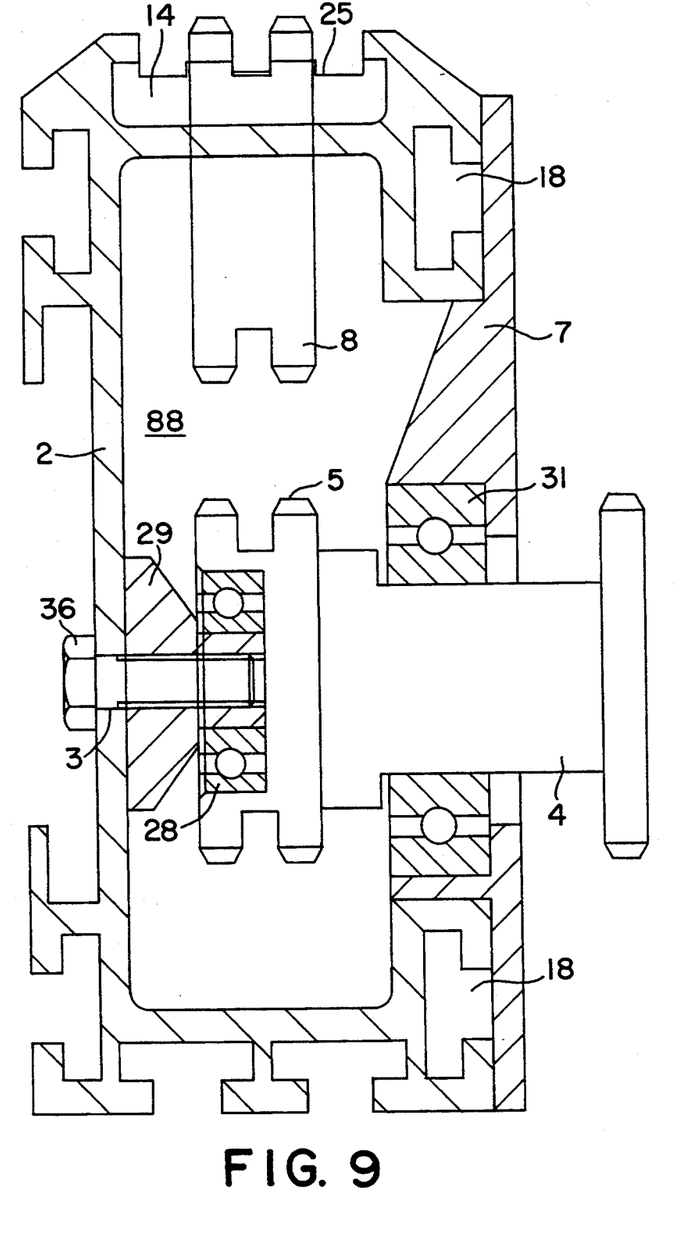
FIG. 9 is a view of a preassembled frame profile of the conveyor system shown in FIG. 1.

FIG. 9 shows the preassembled frame profile 2. The deflection wheels 8 and the chain wheels 5 and partially also the drive shaft 4 are disposed in the interior hollow space 88 of the frame profile 2. A fastening screw 36 is guided through the bearing bore 3 and the guide bush 29 is screwed on. The drive shaft 4, which has the guide bearing 28 and the shaft bearing 31, is then mounted on the guide bush 29. If necessary, the mounting of the guide bush 29 on the drive shaft 4 may take place beforehand so that only the fastening screw 26 still has to be introduced. Corresponding to the respective position of the bearing bore 3 in the frame profile 2, the bearing cap 7 with the premounted parts can be positioned and fixed inside the skids 18 at the suitable point of the frame profile 2. An analogous process applies to the deflection wheels.

The present invention provides a constructional unit by means of which a standardization and forming of a modular construction system for chain conveyors, accumulating chain conveyors and/or toothed belt conveyors become possible.

I claim:

1. A constructional unit for standardizing and forming a modular construction system for at least one of chain conveyors, accumulating chain conveyors and toothed-belt conveyors driven by a motor via one of a chain and a belt and for providing a transport path for goods, the constructional unit comprising:

at least one frame profile having an upper edge, a bearing cap arranged on a first side of the frame profile, a first plurality of prefabricated bearing bores at respective first profile points, and a second plurality of prefabricated bearing bores at respective second profile points;

at least one drive shaft premounted by one of the first plurality of prefabricated bearing bores at the respective first profile point and disposed through the bearing cap;

a slide strip to cover the upper edge of the frame profile;

a chain wheel carried by said drive shaft;

a tensioning box premounted by one of the second plurality of prefabricated bearing bores at the respective second profile point;

one of deflection pulleys and deflection wheels, positioned on the frame profile, to guide the one of chain and belt and which project beyond the upper edge of the frame profile, said one of deflection pulleys and deflection wheels corresponding with the drive shaft by way of the tensioning box;

an intermediate shaft to carry an adapter function between the drive shaft and the motor; and a motor console arranged on the frame profile, to support the motor.

2. The constructional unit according to claim 1, wherein:

the frame profile comprises one of skids and grooves; and at least one of the motor console and the bearing cap being slidably arranged and fixed in corresponding ones of the one of the skids and grooves.

3. The constructional unit according to claim 1, wherein the frame profile is hollow.

4. The constructional unit according to claim 1, wherein the frame profile has a U-shaped cross-section, formed by a top wall, a bottom wall, a first side wall, and a second side wall divided in two by an opening, the second side wall facing toward the transport path.

5. The constructional unit according to claim 1, wherein the frame profile has a top wall, a bottom wall, a first side wall, and a second side wall divided in two by an opening, each wall having at least one skid, each skid receiving corresponding elements of the constructional unit.

6. The constructional unit according to claim 5, wherein each skid has a T-groove-shaped design.

7. The constructional unit according to claim 1, wherein the drive shaft and the chain wheel are constructed in one piece.

8. The constructional unit according to claim 1, further comprising:

a guide bearing;

the drive shaft having a face pointing away from the transport path; and one of the drive shaft and the chain wheel having a recess to receive the guide bearing.

9. The constructional unit according to claim 1, further comprising:

a fixable guide bush fitting into the guide bearing.

10. The constructional unit according to claim 1, further comprising:

a shaft bearing; and the bearing cap having a recess to receive the shaft bearing.

11. The constructional unit according to claim 1, wherein the drive shaft has a face pointing toward the transport path and a coupling device which corresponds with the intermediate shaft.

12. The constructional unit according to claim 11, wherein the coupling device of the drive shaft is a chain wheel.

13. The constructional unit according to claim 1, wherein the slide strip has teeth, thereby forming a comb-like shape, the teeth being directed away from the frame profile.

14. The constructional unit according to claim 1, wherein the tensioning box has at least one deflection head.

15. The constructional unit according to claim 1, wherein the tensioning box has a plurality of oblong-hole-shaped bearing and fixing recesses to receive the second plurality of prefabricated bearing bores.

* * * * *